JOSEPH HIRSH, OF CHICAGO, ILLINOIS.

Letters Patent No. 86,398, dated February 2, 1869.

IMPROVED ADHESIVE COMPOUND AND PLASTER.

The Schedule referred to in these Letters Patent and making part of the same.

*To all whom it may concern:*

Be it known that I, JOSEPH HIRSH, of Chicago, in the county of Cook, and State of Illinois, have invented a new and improved Adhesive Compound; and I do hereby declare the following to be a full, clear, and exact description thereof, which will enable those skilled in the art to make and use the same.

In the first place, I take ten pounds of dextrine, four pounds of starch, and one pound of glue, and dissolve them by boiling in twenty-five pounds of water. I also dissolve, in five pounds of water, one pound of borax and five pounds of caseine, and add this solution to the one mentioned before. To the whole I add one-half of an ounce of nitro-muriatic acid, of commercial strength, and afterward one ounce of glycerine.

Water, dissipated during boiling, I replace by fresh quantities of the same.

After the complete solution and mixture of all the substances named, I pass the same through a bag, woven very densely, which retains all impurities contained in the mixture. This filtration I carry on while the liquid is still hot.

The proportion of the raw material mentioned above, the most advantageous, although it may be varied, with the different qualities of glue, dextrine, or starch, without changing the nature of the solution.

This constitutes the first step or degree of my manipulation.

In this mixture, the adhesive qualities of the dextrine and boiled starch are increased by the addition of glue and caseine, which also impart to the mixture elasticity after drying. The glycerine always keeps the dry material pliable, and prevents its cracking, when applied to any surface.

In the second place, I take a sheet of vegetable or animal tissue, such as paper, or parchment, or cloth, made of cotton, linen, wool, or silk, &c., and spread it upon a table or board, one side of which is slightly elevated, fastening the edges of the cloth in such a manner as to keep it firmly spread, without producing folds.

This paper or tissue may be either plain or colored, or may have a device, or label, or trade-mark, &c., printed upon the side which is not to be coated with the preparation described in the first degree of this process.

I next take a brush, the length of which is equal to the width of the sheet, and dip it into the solution, prepared and kept ready, as described in the first step of this process. With this brush I spread the liquid over the sheet, starting at the more elevated side of the latter, and brushing downward. In this manner the sheet is coated with the liquid at one stroke of the brush, while the surplus of the liquid is at once removed down the inclined table or board.

Although I consider this mode of coating a sheet of tissue, the most simple and effective, any other method which will completely cover the surface of the sheet with the liquid, may be employed in its stead.

This constitutes the second degree or step in my manipulation.

In the third degree, I keep ready, and prepared, a sheet of cotton cloth, spread upon two pulleys, in a horizontal position, in the same manner in which an ordinary belt is stretched upon two pulleys for the purpose of driving machinery.

Beneath this belt of cotton cloth, I keep a series of steam-pipes, or some other source of heat.

Upon the belt, the sheets of moistened tissue are placed, (dry side downward,) and a slow motion is given to the cotton belt by an appropriate mechanism.

The sheets in this manner pass the whole distance of the cotton belt, while they are continually exposed to the heat arising from below, as mentioned. The latter dries the sheets, which arrives in this state at the end of the belt, where they drop off and are collected.

This method of drying, I deem most expedient, although any other may be used, provided the temperature is not too high, about 212° Fahrenheit being the best for the present purpose.

This constitutes the third step in my manipulation.

In the fourth degree, I cut the sheets, prepared as mentioned in the preceding step of my manipulation, into various shapes and sizes, such as strips of various width and length, circular, oval, square, polygonal, or star-like pieces. This may be done by appropriate machinery, by punching, cutting, &c., pieces of the same shape always being collected together.

If the sheets contain a number of labels, or devices, or trade-marks, &c., the cutting has to be done conforming with the shape of such labels, &c.

This constitutes the fourth step of my manipulation.

In the fifth degree, I keep ready, in a box, or other appropriate vessel, a number of pieces of cut tissue, prepared as described in the preceding steps, as also a moist sponge or cloth. The package that is to be closed, is folded as usual, and whenever the folded ends meet, they are covered with a piece of such tissue moistened previously on the sponge or cloth, on the coated side, and pressed slightly with the finger.

These pieces of tissue must differ in size and shape with that of the package, i.e., a large package, or one of heavy paper, or pasteboard, must be covered with a larger sheet than a small package, or one of thin paper, as the strength of the closing tissue is corresponding to its surface of contact.

For closing a bottle, a strip of such moistened tissue may be spread over the cork, or stopper, from one side of the neck of a bottle to the other.

The application of tissue, in the manner described, can be effected with more dispatch and neatness, and cheaper than the modes used heretofore, while a package, closed in this manner, cannot be opened unnoticed.

Having thus described my invention,

What I claim as new, and desire to secure by Letters Patent, is—

1. An adhesive compound, prepared as herein described.

2. Tissue, coated with the adhesive compound above described, substantially as and for the purpose set forth.

This specification, signed by me, this 9th day of October, A. D. 1868.

JOSEPH HIRSH.

Witnesses:
J. WINSHIR,
JULIUS KATZ.